United States Patent [19]

Scarffe

[11] Patent Number: 4,543,638
[45] Date of Patent: Sep. 24, 1985

[54] MECHANICAL HANDLING APPARATUS

[75] Inventor: Michael F. Scarffe, Milton Keynes, England

[73] Assignee: V.S. Engineering Ltd., Luton, England

[21] Appl. No.: 414,815

[22] Filed: Sep. 3, 1982

[30] Foreign Application Priority Data

Sep. 23, 1981 [GB] United Kingdom ................. 8128694

[51] Int. Cl.$^4$ ............................................. G05B 15/02
[52] U.S. Cl. ..................... 364/513; 364/182;
364/188; 318/568; 901/16; 901/11; 901/22;
901/24
[58] Field of Search ............... 318/568, 592, 593, 594;
901/11–24; 364/513, 474, 182

[56] References Cited

U.S. PATENT DOCUMENTS

| | | | |
|---|---|---|---|
| 3,654,613 | 4/1972 | Dunne et al. | 364/513 |
| 3,935,950 | 2/1976 | Burch | 901/20 X |
| 4,134,318 | 1/1979 | Wang et al. | 364/513 X |
| 4,187,051 | 2/1980 | Kirsch et al. | 901/22 X |
| 4,187,454 | 2/1980 | Ito et al. | 318/568 |
| 4,229,136 | 10/1980 | Panissidi | 901/22 X |
| 4,319,864 | 3/1982 | Kaufeldt | 901/20 X |
| 4,379,335 | 4/1983 | Kirsch et al. | 318/568 X |
| 4,447,697 | 5/1984 | Dunne et al. | 318/568 X |

FOREIGN PATENT DOCUMENTS

2045468 10/1980 United Kingdom .

*Primary Examiner*—Jerry Smith
*Assistant Examiner*—Allen MacDonald
*Attorney, Agent, or Firm*—Harness, Dickey & Pierce

[57] ABSTRACT

A mechanical handling apparatus for point to point movement has utilization grippers driven from point to point by an arm assembly comprising a piston and cylinder arrangement in which the piston is in force balance until activated by a microprocessor. The microprocessor controls the energization of an electrical solenoid of each of a plurality of valves. The grippers are carried by a load beam, supported by bearings and a selectively energizable brake for resisting motion of the load beam is mounted on a lead screw. The lead screw is driven by a stepper motor but is connected with a microprocessor, and the position of the load beam and of the brake is determined by a transducer. In operation, the microprocessor permits energization of the piston to rapidly drive the load beam and hence the grippers toward a desired point within the capture range of the lead screw. The brake is applied to stop the load beam and final, accurate positioning of the grippers is performed by energizing the stepper motor.

39 Claims, 4 Drawing Figures

MECHANICAL HANDLING APPARATUS

BACKGROUND OF THE INVENTION

This invention relates to a mechanical handling apparatus and in particular to a movable arm arranged to be connected to a handling device such as a gripper, vacuum cup or electro magnetic pad.

In present day assembly line manufacture there is a need for routine functions to be performed by a mechanical handling apparatus, usually known colloquially as a "robot". Probably the simplest form of handling apparatus moves in a single plane and has a handling device connected to one end of a movable arm. Such a movable arm may comprise a movable piston mounted in a static cylinder with pneumatic pressure determining the direction and extent of travel of the movable arm. It will be realised that an apparatus capable of moving in two planes can be manufactured by connecting the first arm to a perpendicularly disposed further arm so that, for example, if the first arm moved in a horizontal or x direction then the second arm is made to move in a vertical or y direction. So as to provide a machine capable of moving in a third direction, the z direction, yet a further movable arm similar to the first two arms is connected via a rack and pinion to the second movable arm so that linear motion of the piston is converted to rotational motion to rotate the second, vertically disposed arm. The arms are linked to a programming source in which a series of instructions concerning the movements of the arms is held and in dependence upon the instructions held by the programming source so the arms are able to perform repetitive motions.

In a known mechanical handling apparatus the speed of motion of the arms is slow since it will be realised that the arms must cease movement at a precise point and if the velocity of the arms is too great, overshoot will occur.

The present invention seeks to provide a mechanical handling apparatus which is relatively fast in moving from one point to another and yet which has a high degree of positional accuracy.

According to this invention there is provided a mechanical handling apparatus for point to point movement including arm means connected to a utilisation means, actuator means for driving said utilising means toward a predetermined, prescribed, point, brake means arranged to selectively arrest motion of the arm means and to be driven by a stepper motor means over a predetermined, limited range, and position detecting means arranged to detect the respective positions of the utilisation means and of the brake means relative to a datum, the position detecting means being connected to a control means and said control means defining the point to point movement instructions of the utilisation means and being arranged to sequentially energise the actuator means, if required, to drive the utilisation means towards said prescribed point and within the range of said stepper motor means, activate the brake means to arrest motion of the arm means and drive the stepper motor means to bring the utilisation means to the prescribed point.

The apparatus at the present invention enables the utilisation means to be rapidly driven to approximate desired stopping point by the actuator and then to be accurately located by the stepper motor means so that the advantages of high speed and good accuracy are obtained.

Preferably, the actuator means comprises a cylinder and associated movable piston, said piston being connected to the arm means, a pressure source and a valve means arranged to maintain the piston substantially in force balance by application of force from said pressure source until activated by a signal from the control means.

Advantageously the arm means comprises a load beam means connected to and movable with said piston, said load beam means being supported by bearing means.

Normally the control means includes a store means containing said point to point movement instructions and coordinates.

Preferably, the pressure source is a source of compressed air, the actuator means is pneumatic and the valve means comprises at least one electrical solenoid operated air valve connected between the pressure source and a respective side of the piston in the cylinder with a regulator in one of the lines to ensure a different pressure on opposing sides of the piston and thereby maintain the piston in substantial force balance until activated to destroy the force balance.

Conveniently the air valves of the valve means have a normally open port connected to the pressure source, a common port connected to a respective side of the piston and a normally closed port connected through the intermediary of a piston velocity governing means to an exhaust.

Preferably the pressure source is also connected to the normally closed port of an air valve determining the operation of the brake means. In a preferred embodiment the piston velocity governing means comprises a plurality of electrical solenoid operated air valves connected such that any one or combination thereof vents air from said valve means in an amount determined by the position of the piston in the cylinder whereby the piston is driven with a substantially constant, predetermined, velocity irrespective of the position thereof within the cylinder. Advantageously, the vent ports of respective valves of the piston velocity governing means have differing cross-sectional areas to maximise the number of different vent cross-sectional openings and in such manner provide said substantially constant predetermined velocity of the piston.

Advantageously the load beam means comprise a load beam having on respective opposing sides thereof a rail, each rail being arranged to be guided by said bearing means which comprise a pair of longitudinally disposed rollers for each rail. The load beam conveniently has an inverted U shaped cross section.

Preferably the brake means comprises a calliper having two arms which are pivoted at one end and carry friction material at the outer faces of the free ends thereof for engagement with the inside faces of the U shaped load beam in dependence upon the position of an activating means. Conveniently the activating means comprises a cylinder formed in the outer surfaces of each arm intermediate the pivot and friction material, a dumb bell shaped piston extending across the pivot axis of the calliper with a pressure equalising channel extending through the central portion of the dumb bell into each cylinder, a port for admitting pneumatic pressure to one of the cylinders and a compression spring for maintaining the non-activated state of the brake means, whereby in operation the piston is stationary and the callipers move. In the currently preferred embodiment the brake means is normally held in engagement with the load beam means and is released by admitting pneumatic pressure to one of the cylinders.

Preferably the stepper motor means is connected to a lead screw upon which the brake means is located in a substantially backlash free manner, the axis of the lead screw being substantially parallel to the axis of the load beam means. Advantageously, the brake means is mounted on the lead screw through the intermediary of axially disposed recirculating ball nuts. So as to permit a small amount of axial misplacement a flexible coupling is provided between the stepper motor means and the lead screw.

The position detecting means is advantageously an absolute displacement transducer known as a Temposonic series DCTM comprising a rod having at one end thereof means for producing an electrical launch pulse at a predetermined repetition rate and a torsion transducer, and circumferentially surrounding said rod and longitudinally spaced therealong is a pair of magnet means, one connected to travel with the load beam means and the other connected to travel with the brake means, and distance determining means for determining the time taken for a launched pulse to be returned from a respective one of the magnet means as a torsion pulse to the torsional transducer from which time the position of the respective magnet means can be determined. Normally the magnet means is formed by four equi-circumferentially spaced magnets.

Preferably the control means further includes an electronic microprocessor connected to receive and provide inputs to the store means and the position detecting means, and in dependence thereon to transmit commands to the valve means, the piston velocity governing means, the valve determining the operation of the brake means and the stepper motor means.

Conveniently said store means comprises a CMOS random access memory (CMOS RAM) for data storage and a random access memory (RAM) for temporary data storage. Advantageously the CMOS RAM is arranged so that after each terminal point of travel of the utilisation member has been reached it updates the information in the RAM so that a minimum amount of travel of the brake means along the stepper motor lead screw is required.

The utilisation means may be pneumatic finger members, vacuum cups or electro magnetic pads.

Preferably motion in x and y perpendicularly disposed directions is provided by mounting two arms perpendicularly arranged with respect to each other such that the utilisation means of one is the arm of the other. For motion in three mutually perpendicular x, y and z directions the utilisation means of each of two arms are connected in mutually perpendicular fashion to a different arm such that the mounting for the x arm forms the apparatus mounting respective to which motion takes place in each of the three directions.

Advantageously the store means contains information concerning spatial parameters defining a no-go area through which it is impermissible for the utilisation means to pass and instructions are provided to enable the utilisation means to manoeuvre around such a no-go area.

Conveniently, the store means is provided with a plurality of differing sets of strategy information, each set defining a type of motion the utilisation means is to make, and means are provided for selecting a particular strategy in combination with start and finish co-ordinates the utilisation means is to adopt, whereby the motion of the utilisation means between its start and finish coordinates is determined by the strategy selected.

BRIEF DESCRIPTION OF DRAWINGS

The invention will now be described by way of example with reference to the accompanying drawings, in which.

DESCRIPTION OF THE PREFERRED EMBODIMENT

Figure 1:
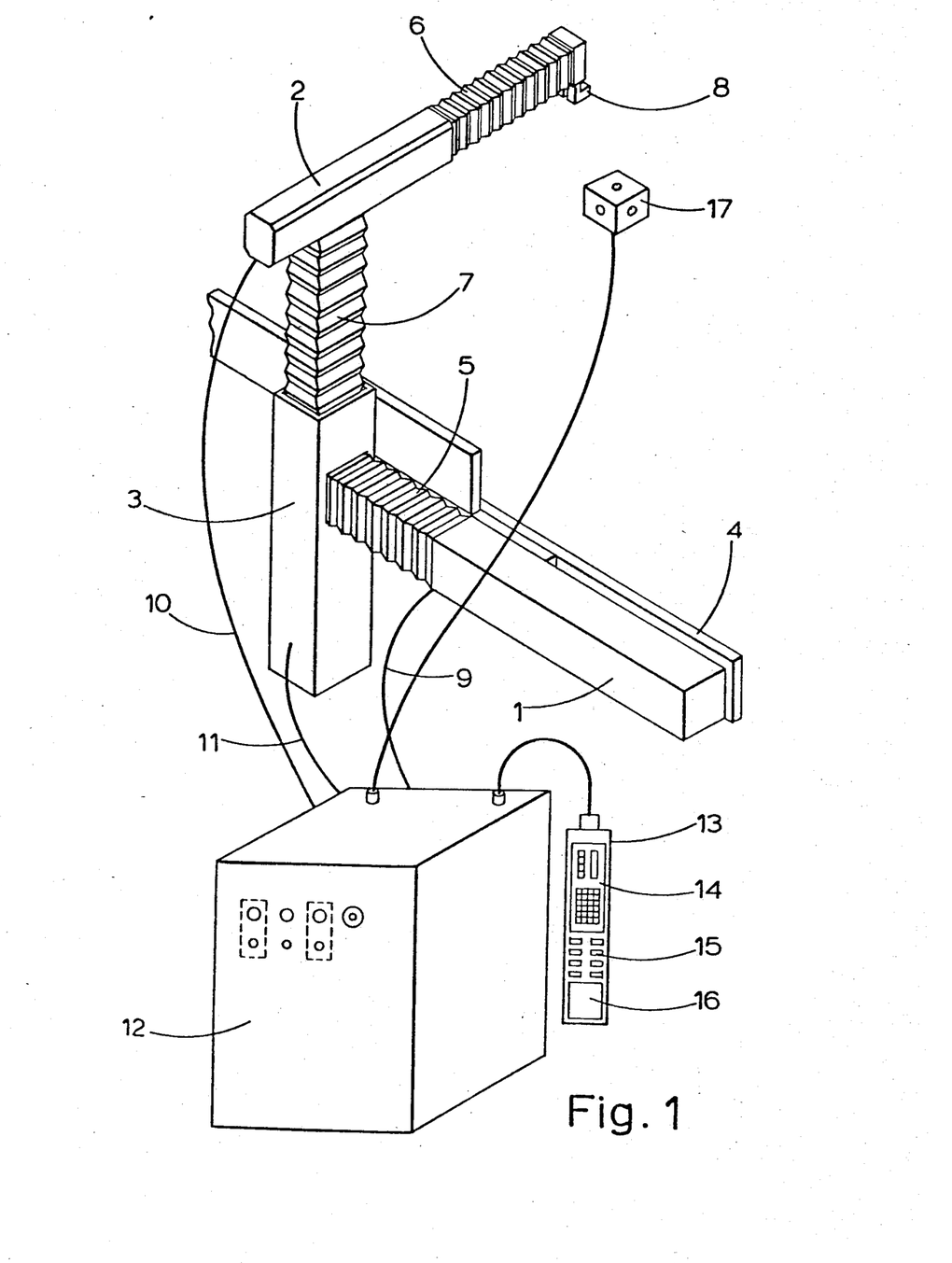
FIG. 1 shows a pictorial view of an apparatus in accordance with the invention for moving in three mutually perpendicular x, y and z planes.

The mechanical handling apparatus shown in FIG. 1 has three mutually perpendicular arms 1, 2 and 3 for movement in x, y and z directions respectively. The x direction arm 1 is mounted on a platform 4 and an extending portion of the arm 1 is enclosed within a bellows 5. Similarly, the extending portion of arms 2 and 3 are also housed within bellows 6 and 7 respectively. The remote end of arm 2 from arm 3 is connected to a finger gripper 8 which may take any known convenient form and is operable in known fashion. Each of the arms 1, 2 and 3 is connected by electrical cables 9, 10, 11 respectively to a control apparatus 12 having a switching station 13 incorporating a key pad 14 such as that made by Burr Brown Model No. TM71, movement control 15 and a scratch pad or coding list 16. The control apparatus also has a local controller 17 for operation of the arms by an operator positioned adjacent to a work station.

Since each of the arms are identical the following description will be made with reference to a single arm for movement in one direction by an actuating means but it is to be understood that by using appropriately orientated and connected arms movement in any direction can be achieved.

Figure 2:
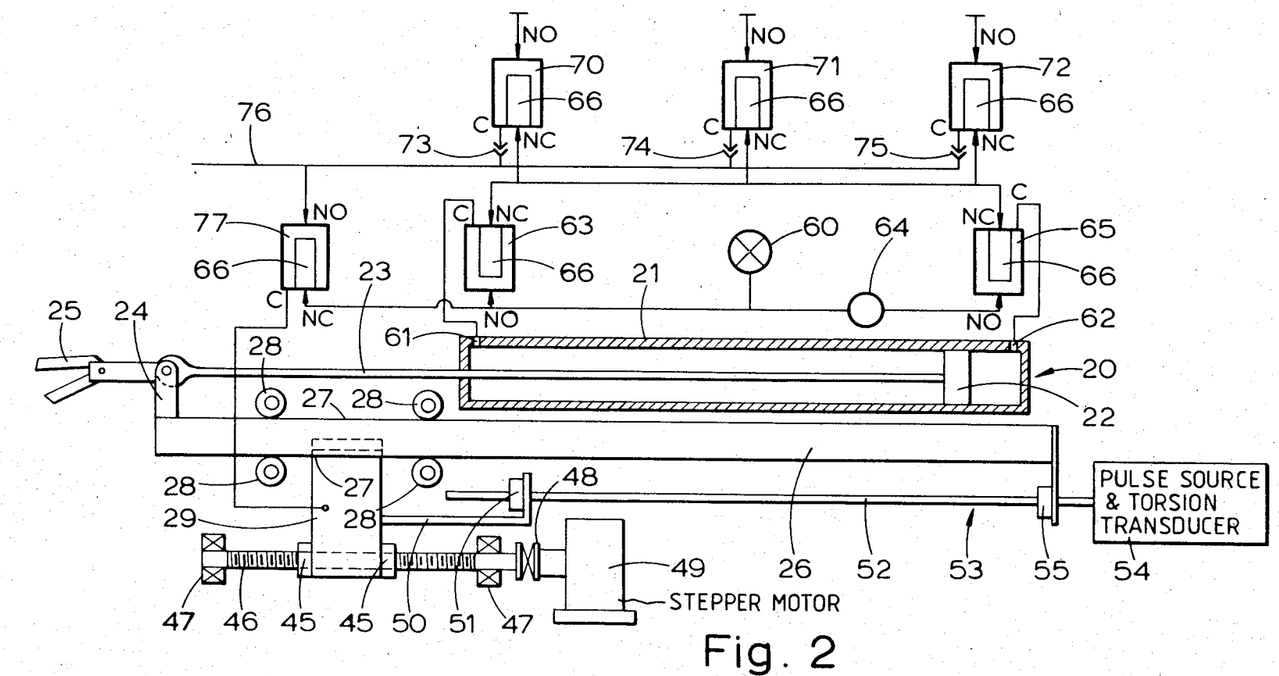
FIG. 2 shows in schematic form one of the arms for moving in one of the directions.

Referring now to FIG. 2, a pneumatic actuator 20 has a stationary cylinder 21 and a movable piston 22 sealingly engaging with the internal walls of the cylinder. The piston 22 has a rod 23 connected to an arm 24 supporting a utilisation means which is depicted as being a pair of pneumatic fingers 25 although the utilisation means may be any apparatus known per se such as vacuum cups or electro magnetic pads. The arm 24 is connected to a load beam 26 which extends in a direction parallel to the direction of motion of the piston 22. The load beam has a rail 27 on opposing longitudinal sides and each rail 27 is guided by longitudinally disposed rollers 28; the rails 27 and rollers 28 may be those marketed by Hepco Slide Systems Limited under Part Nos: S-870-1, S-510-1 or M-780-3 for the rails with the latter Part Number having a back plate BP-1050-3, and the rollers being Part Nos. JA-7-E/C or JA-10-E/C. The load beam 26 includes an inverted U shaped cross section and connected to engage with the inside faces of the U shaped cross-section is a brake mechanism 29 positioned between the stationarily mounted rollers 28.

Figure 3:
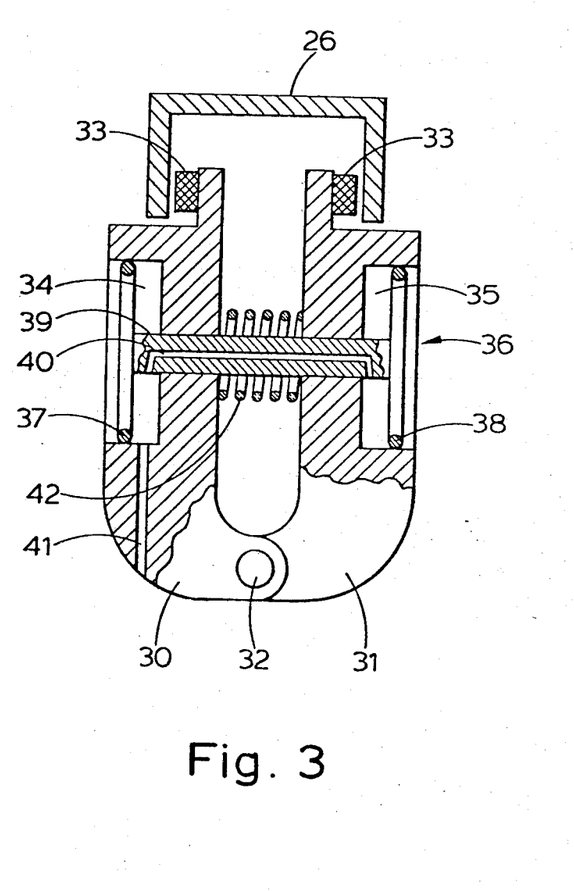
FIG. 3 shows a vertical cross-section through a brake.

The brake mechanism shown particularly in FIG. 3 is in the form of a calliper having arms 30, 31 which are mounted on a pivot 32 at one end and the free ends of the arms 30 carry friction brake material 33 for engagement with the inside faces of the U shaped part of the load beam 27. A cylinder 34, 35 is located in the outer surface of each of the arms 30, 31 respectively between the pivot 32 and friction material 33 ends of the arms and a dumb bell shaped piston 36 has sealing rings 37, 38 in the cylinders 34, 35 respectively and an axle 39 extending across the axis of the pivot 32. Interconnecting the cylinders 34, 35 is a channel 40 within the axle 39 and a port 41 for admitting pneumatic pressure to cylinder 34 is provided in a side wall of the cylinder 34. A compression spring 42 is mounted over the axle 39 to maintain the friction material 33 normally in engagement with the load beam 26.

Mounted on the same axis as the pivot 32 are a pair of longitudinally spaced recirculating ball nuts 45 for mounting the brake mechanism 29 on a lead screw 46, the axis of which is substantially parallel to the axis of the load beam 26, opposing ends of the lead screw being mounted in bearings 47. One end of the lead screw 46 is connected by a flexible coupling 48 to a DC variable reluctance stepper motor 49, the connection between the stepper motor and the brake mechanism being designed to exhibit substantially zero backlash. The flexible coupling 48 is provided to permit a small amount of axial misplacement with the DC variable reluctance stepper motor 49. The brake mechanism 29 has an arm 50 to which is attached a magnet assembly 51 formed by 4 equi-circumferentially spaced magnets which surround a rod 52 of an absolute displacement transducer 53 known as a Temposonic series DCTM.

The transducer 53 connects the rod 52 to an electrical pulse source and torsion transducer 54. A further magnet assembly 55 similar to the magnet assembly 51 circumferentially surrounds the rod 52 and is connected to the end of the load beam 26 remote from the arm 24 and the arrangement of the magnets 51, 55 is such that the magnets move with the brake mechanism 29 and load beam 26 respectively whilst the rod 52 and pulse source torsion transducer 54 are stationary. The transducer 53 operates in known manner to generate an electrical launch pulse at a repetition frequency of approximately 1 kilohertz and upon meeting the magnetic field produced by magnets 51 and 55 so a torsion is produced in the rod 52 and a sonic torsion pulse is returned to the torsion transducer 54. Again in known manner at the commencement of each launch pulse, pulses produced by a quartz crystal clock oscillator (not shown) are gated to a counter (also not shown) and the clock oscillator pulses are cut off when the sonic torsion pulse is detected from the transducer 54, knowing the number of pulses that have been counted it is possible to determine the distance of a respective one of the magnets 51 or 55 from the pulse source torsion transducer 54. It should here be stressed that the manner of operating and using the transducer 53 is known in the art.

The piston 22 is maintained substantially in force balance by compressed air at a pressure of 75 p.s.i. produced by a source 60. Pneumaic lines from the source 60 are fed via ports 61, 62 above and below the piston 22, the line to port 61 being via an electrical solenoid operated air valve 63 and to the port 62 via a regulator 64 and a further electrical solenoid operated air valve 65 so that the pressure below the piston is 63 p.s.i. and the pressure above the piston is 75 p.s.i. In such a manner force balance is derived in the present invention for arms 1 and 2. However, for arm 3, since it has to carry the weight of arm 2 and the utilisation member 8 so the regulator 64 is provided in the line to port 61 and the pressures above and below the piston 22 are reversed.

The electrical solenoid operated air valves described herein are all of the same type and for ease of drawing only the sealing member 66 of the valves is shown and the sealing member is shown in its rest i.e. non-activated position. The designations N O represent the normally open port, N C represents the normally closed port and C represents the common port which is always open. Thus the valves 63, 65 have their normally open ports connected to the lines from the pressure source 60, the common ports of the valves 63, 65 are connectred to the ports 61, 62 respectively and the normally closed ports of the valves 63, 65 are interconnected. The connection between the normally closed ports of valves 63, 65 is fed to the respective normally closed port of a bank of three further electrical solenoid operated air valves 70, 71, 72 the normally open ports of the valves 70, 71, 72 being blocked. The common port of each valve 70, 71, 72 is connected via an air restricter 73, 74, 75, each restricter being of differing diameter, to a common exhaust 76. The purpose of the valves 70, 71, 72 and of their respective restrictions 73, 74, 75 is to govern the velocity of the piston 22 so that irrespective of the position of the piston 22 along the cylinder 21 so the piston 22 moves with a substantially constant velocity. By using valves 70, 71, 72 having differing restrictions 73, 74, 75, it is possible to maximise the number of different vent cross-sectional openings by opening any one or combination of the valves 70, 71, 72 and thereby effect the substantially constant predetermined velocity to the piston that is, required. A further electrical solenoid operated air valve 77 has its normally closed port connected to the compressed air source 60, its normally open port connected to the exhaust 76 and its common port connected to the port 41 on the brake mechanism 29.

Figure 4:
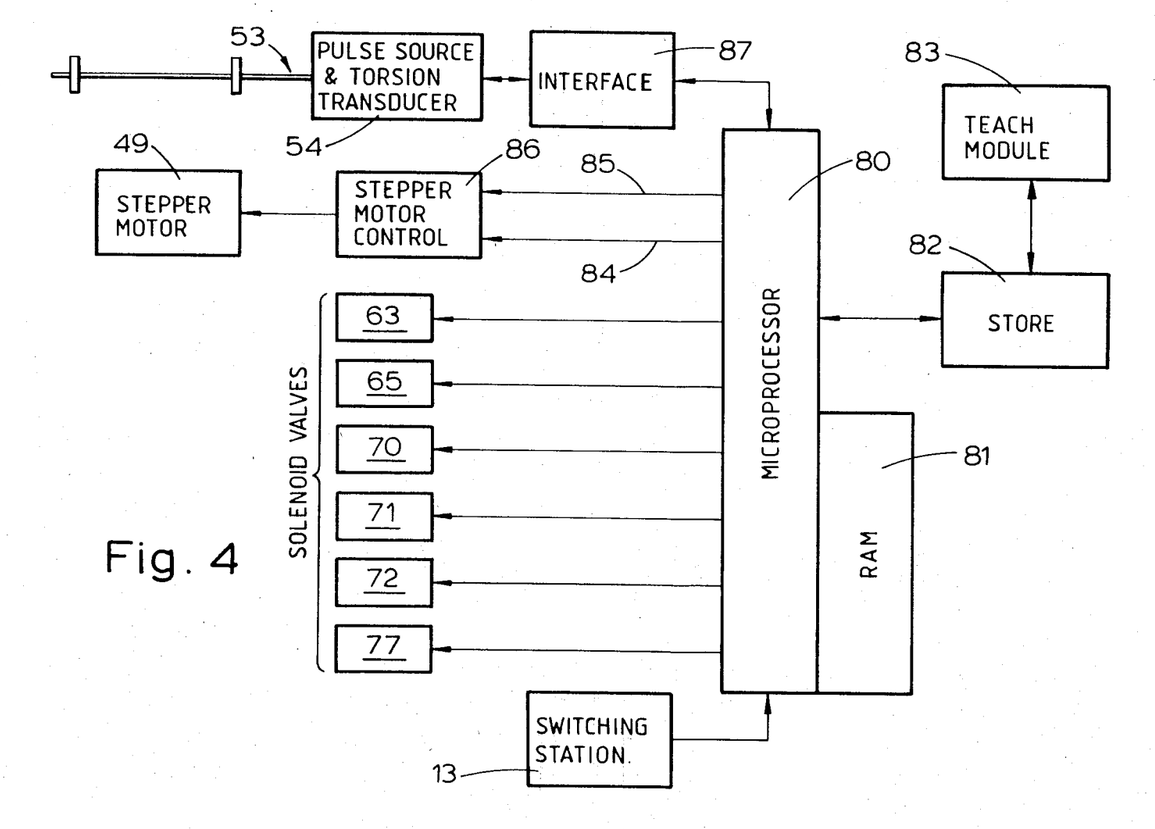
FIG. 4 shows in block schematic form a control connection wiring diagram.

Referring now to FIG. 4 the control apparatus 12 includes a microprocessor 80 such as a Texas Instruments 9900 connected to a scratch pad read/write random access memory (RAM) 81 such as Texas Instruments TMS 2114/45NL used in working calculations by the microprocessor 80 for the sequence of steps that the arm or arms are to obey. The microprocessor 80 is connected over a two-way highway bus to a store and programming module 82 which is a CMOS RAM such as Toshiba Serial No. TC5504P1. The module 82 has a standby battery power supply (not shown) to protect the information stored in the module in the event of a power supply breakdown. The module 82 contains at least the following programming details:

1. Positional information,
 2. Method of moving to a required position (strategy),
 3. Times of operating the utilisation member,
 4. Tests for other inputs, such as a test to determine whether a press has operated,
 5. The generation of other outputs, for example, an instruction to a press to operate,
 6. Spatial parameters defining a no-go area through which it is impermissible for the utilisation member to pass and, instructions to enable the utilisation member to move around such a no-go area,
 7. Editing information.

The module 82 is also connected over a two-way bus to a teach module 83 which is provided to input instructions to the module 82. In this respect point to point information of an arm may be inputted to the module 82 by the teach module 83 by for example manually leading the utilisation member through the various points to be stored in the module 82 or by switching the arm to its various point to point positions or by predefining the point to point positions in absolute terms. A further technique of inputting the taught sequence of events the utilisation member is to perform, is to use a predefined strategy. In this respect, numerous different strategies may be used to move at utilisation member from point x to point y, e.g. the utilisation member may move:

(a) in a straight line,
(b) along the z axis precisely, then along the x axis precisely and finally along the y axis precisely,
(c) along the y axis precisely, then along the x axis precisely and finally along the z axis precisely,
(d) along the x axis precisely then simultaneously along a diagonal formed by the y and z axes,
(e) by rising to a clearance on the z axis by a generous amount, then to the approximate position of a predetermined datum, then along a diagonal of x and y axes precisely and z approximately, then the z axis precisely.

By using such a technique of programming the strategies into the module 82 it is not necessary to teach the utilisation member every single one of the points it is to pass through. For example, by selecting say strategy (e) above, and programming only the start and finish coordinates of the utilisation member so it is not necessary to program the rise on z which may perhaps be required to clear the lip of a container. The amount of programming necessary is therefore reduced by such technique.

The switching station 13 comprising the operators panel has an output therefrom to the microprocessor 80 and the switching station 13 is operative to provide instructions to the microprocessor to (1) move the apparatus a single step at a time, e.g., extend or retract an arm, followed by a next step of operating a gripper utilisation member, or (2) perform one complete cycle of events, (3) stop in an emergency, (4) pause/continue movement of the gripper, (5) continuously run the apparatus.

The microprocessor 80 is connected to each of the electrical solenoids of the valves 63, 65, 70, 71, 72 and 77 and also over an off/on link 84 and a direction (clockwise/anticlockwise) link 85 to a stepper motor drive control unit 86 which is in turn connected to the stepper motor 49. The absolute displacement transducer 53 is connected over a two way high way to a drive and interface circuit 87 and the circuit 87 is connected in turn over a two way link to the microprocessor 80.

It will be understood that in FIG. 4 none of the power supply connections have been shown for clarity but such connections are of course in practice supplied. Further it is not thought necessary to recite a particular programme since each varies from application to application of the apparatus and such programming is well within the purview of the person skilled in the art.

In use of the arm shown in FIGS. 2–4 the transducer 53 determines whether the desired movement of the fingers 25 are within the capture range of the lead screw 46 and if it is determined by the microprocessor 80 that such is the case then the stepper motor drive control is activated via link 84 and the lead screw is rotated via instructions over link 85, since the brake friction material 33 is clamping the underside of the load beam 26 and the rails are thereby moved through the rollers 28. When the desired position has been reached as determined by the transducer 53 so the microprocessor 80 instructs the stepper motor drive control unit 86 to switch off and an instruction from the microprocessor 80 over a link (not shown) is sent to the fingers 25 for them to perform a desired function.

Suppose now that the desired arm movement is outside the range of the lead screw then the following sequence of steps is taken:

1. Substantially simultaneously:
   a. The transducer 53 senses the position of magnet 55 and thereby the microprocessor 80 determines in which direction the load beam 26 is to travel. Accordingly, the microprocessor sets one of the valves 63 or 65, the valve 63 being activated if it is desired to extend the arm (i.e. drive the piston 22 and load beam 26 to the left as viewed in FIG. 2) or to activate valve 65 if it is desired to retract the arm.
   b. A predetermined one or combination of valves 70, 71 or 72 is activated in dependence upon the position of the piston 22 along the cylinder 21.
   c. The brake valve 77 is activated, and
   d. the microprocessor drives the stepper motor 49 so that the brake is centralised along the lead screw, as determined by the position of magnet 51. In this manner, the greatest amount of travel of the brake along the lead screw in each direction is afforded.

In activating say, valve 63 the sealing member 66 is raised to open the normaly closed port of valve 63 and to thereby decrease the pressure on the top of the piston 22. The piston 22 therefore is extended out of the cylinder 21. The air pressure exhaust from valve 63 is conveyed via any one or combination of valves 70, 71 or 72 in such a manner that no matter what the starting position of the piston 22 in the cylinder 21 so the piston 22 moves with a substantially constant velocity.

In activating the valve 77 so the sealing member of that valve opens the normally closed port so that air pressure is applied via port 41 to the cylinder 34 of the brake mechanism 29. Because the sealing rings 37 of the piston 36 are fixed to the axle 39 so the arms 30, 31 rotate about pivot 32 thereby compressing spring 42 and disengage the friction material 33 from the load beam 26.

2. The load beam 26 thus starts to accelerate and the acceleration of the beam is determined by the microprocessor 80 from positional information of the magnet 55 derived from the transducer 53.

3. The microprocessor then predicts the best braking point to stop the fingers 25 at the required position and such mathematical computation is performed in a manner known per se.

4. At the required braking point, the microprocessor 80 transmits signals to the direction valves 63 or 64, the valves 70, 71, 72 and the braking valve 77 so that the previously activated valves are deactivated. The load beam 26 and hence fingers 25 are thus brought to a stop.

5. The microprocessor then reads the position of the magnet 55 and after five readings that are all the same it is assumed that the beam has in fact stopped. The positional information of the magnet 55 is compared with the desired value and the microprocessor then sets the links 84, 85 to drive the stepper motor 49 which in turn rotates the lead screw 46. Since the brake is engaging with the load beam so the load beam and hence fingers 25 are moved to the position desired. Positional information of the beam is again determined from magnet 55, it being realised that the pulse source and torsion transducer 54 represents the fixed datum from which measurements are taken. When the microprocessor 80 determines that the fingers 25 are in the desired position then the direction signal on link 85 is cancelled and an OFF signal is sent over link 84 to the stepper motor 49.

The fingers 25 are then at a desired point and may be operated in known manner.

By using the microprocessor of the present invention it has been found that after each terminal point of travel has been reached it is possible to update the information in the programming module 82 so that a minimum amount of travel of the brake mechanism 45 along the lead screw 46 is required so that the speed of point to point movement of the apparatus is enhanced.

Having now described the invention it will be realised that the apparatus of this invention enables an arm to be rapidly driven to an approximate desired stopping point and then for the arm to be accurately located by the stepper motor so that the advantages of high speed derived from the pneumatic actuator 20 and of accuracy derived by the stepper motor 49 and lead screw 46 are obtained.

In a practical embodiment of the present invention the following parameters were provided:
Maximum loading on arm: 5 kilograms
Maximum stroke/travel of x and y axes: 610 millimeters
Maximum stroke/travel of z axis: 305 millimeters (610 millimeters being optionally available)
Positional accuracy on all axes: plus or minus 0.052 millimeters (repeatability 5 percent of resolution)
Stored positions: maximum of 1,000 stored positions available
Positional speed of manipulator arm: minimum 0.3 meters per second
Point to point transfer time: 2 seconds maximum
3—axis transfer speed: minimum 0.52 meters per second
Maximum z axis downward force: 310 N
Electrical supply 220-240 volts AC
Air supply: 56 liters per minute
Dimensions: y axis—1168 millimeters collapsed, 2007 millimeters extended; x axis—1041 millimeters telescoped 1753 millimeters extended; z axis—978 millimeters collapsed, 1283 millimeters extended.

I claim:

1. An improved mechanical handling apparatus for point to point movement comprising:
    an arm assembly having a utilization device affixed to an end thereof and including actuation means for moving said utilization device toward a desired point;
    transducer means operatively associated with said arm assembly for generating a position signal indicative of the position of said utilization device relative to a datum;
    brake means operatively associated with said arm assembly for selectably preventing relative movement between said brake means and said utilization device;
    vernier adjustment means connected to said brake means for moving said brake means relative to said datum over a predetermined limited range;
    control means programmed to control the movement of said utilization device to said desired point in accordance with said position signal by energizing said actuation means if required to bring said utilization device within said predetermined limited range of said desired point, actuating said brake means to prevent relative movement between said utilization device and said brake means, and energizing said vernier adjustment means to accurately position said utilization device at said desired point.

2. The mechanical handling apparatus of claim 1, wherein said vernier adjustment means comprises a stepper motor for rotatably driving a shaft having threadably engaged thereon said brake means.

3. The mechanical handling apparatus of claim 1, wherein said arm assembly includes a load beam adapted for sliding engagement with said brake means when energized, said brake means frictionally engaging said load beam when unenergized.

4. The mechanical handling apparatus of claim 1, wherein said actuation means including a cylinder and piston assembly and wherein said control means includes means for pneumatically driving said piston at a substantially constant velocity along the entire stroke of said piston.

5. An improved mechanical handling apparatus for point to point movement including:
    a utilization device;
    an actuator comprising a cylinder and a movable piston connected to said utilization device and defining the motion prescribed for said utilization device;
    a load beam connected to and movable with said piston;
    brake means operatively associated with said load beam for selectably engaging said load beam to prevent relative movement therebetween;
    stepper motor means connected to said brake means for moving said brake means over a relatively small predefined range;
    position transducer means for producing a position signal related to the position of said load beam relative to a datum; and
    control means programmed to control the movement of said utilization device to a desired point in accordance with said position signal by energizing said actuator if required to bring said utilization device within said predefined range, actuating said brake means to engage said load beam to prevent relative movement therebetween; and energizing said stepper motor means to accurately position said utilization device at said desired point.

6. A mechanical handling apparatus for point to point movement including arm means connected to a utilization means, actuating means for driving said utilizating means toward a predetermined, prescribed, point, brake means arranged to selectively arrest motion of the arm means and to be driven by a stepper motor means over a predetermined, limited range, and position detecting means arranged to detect the respective positions of the utilization means and of the brake means relative to a datum, the position detecting means being connected to a control means and said control means defining the point to point movement instructions of the utilization means and being arranged to sequentially energize the actuator means, if required, to drive the utilization means towards said prescribed point and within the range of said stepper motor means, activate the brake means to arrest motion of the arm means and drive the stepper motor means to bring the utilization means to the prescribed point.

7. A mechanical handling apparatus as claimed in claim 6, wherein the actuator means comprises a cylinder and associated movable piston, said piston being connected to the arm means, a pressure source and a valve means arranged to maintain the piston substantially in force balance by application of force from said pressure source until activated by a signal from the control means.

8. A mechanical handling apparatus as claimed in claim 7, wherein the pressure source is a source of compressed air, the actuator is pneumatic and the valve means comprises at least one electrical solenoid operated air valve, pneumatic lines connecting said at least one electrical solenoid operated air valve between the pressure source and a respective side of the piston in the cylinder with a regulator in one of the pneumatic lines to ensure a different pressure on opposing sides of the piston and thereby maintain the piston in substantial force balance until activated to destroy the force balance.

9. A mechanical handling apparatus as claimed in claim 8, wherein the air valves of the valve means have a normally open port connected to the pressure source, a common port connected to a respective side of the piston and a normally closed port connected by a piston velocity governing means to an exhaust.

10. A mechanical handling apparatus as claimed in claim 9, wherein the pressure source is also connected to the normally closed port of an air valve determining the operation of the brake means.

11. A mechanical handling apparatus as claimed in claim 9, wherein the piston velocity governing means comprises a plurality of electrical solenoid operated air valves connected such that any one or combination thereof vents air from said valve means in an amount determined by the position of the piston in the cylinder whereby the piston is driven with a substantially constant, predetermined velocity irrespective of the position thereof within the cylinder.

12. A mechanical handling apparatus as claimed in claim 11, wherein the vent ports of respective valves of the piston velocity governing means have differing cross-sectional areas to maximize the number of different vent cross-sectional openings and in such manner provide said substantially constant predetermined velocity of the piston.

13. A mechanical handling apparatus for point-to-point movement including
utilization means,
arm means connected to said utilization means,
actuator means for driving said utilizing means toward a predetermined prescribed point,
a stepping motor means,
brake means coactive with said arm means and said stepping motor means and operative selectively to arrest motion of said arm means and to be driven by said stepping motor means over a predetermined limited range,
position detecting means arranged for detecting the respective positions of the utilization means and of the brake means relative to a predetermined datum, and
control means,
said position detecting means being connected to said control means, and said control means defining the point-to-point movement instructions of the utilization means and being adapted to energize the actuator means sequentially, if required, to drive the utilization means towards the prescribed point within the range of said stepping motor means, to activate the brake means to arrest motion of said arm means, and to drive the stepping motor means to bring the utilization means to said prescribed point.

14. A mechanical handling apparatus as claimed in claim 13, including
a pressure source, and
valve means, and
wherein said actuator means comprises
a cylinder and an associated movable piston,
said piston being connected to said arm means, said pressure source and said valve means being adapted to maintain the piston substantially in force balance by application of force from said pressure source until activated by a signal from said control means.

15. A mechanical handling apparatus as claimed in claim 14,
wherein said arm means comprises
load beam means connected to and movable with said piston, and
bearing means supporting said load beam means.

16. A mechanical handling apparatus according to claim 15,
wherein said control means includes
store means containing said point-to-point movement instructions and coordinates thereof.

17. A mechanical handling apparatus according to claim 16
wherein said pressure source is
a source of compressed air,
wherein the actuator means is pneumatic, and
wherein the valve means comprises
at least one electrical solenoid operated air valve connected between said pressure source and a respective side of said piston in said cylinder, and
regulator means interposed between said pressure source and said cylinder for insuring a different pressure at opposing sides of said piston to thereby maintain the piston in substantial force balance until activated to destroy said force balance.

18. A mechanical handling apparatus according to claim 17, including
piston velocity governing means, and
exhaust means, and
wherein said valve means comprises air valves and wherein said air valves have a normally open port connected to said pressure source, a common port connected to one side of said piston, and a normally closed port connected through the intermediary of said piston velocity governing means to said exhaust means.

19. A mechanical handling apparatus as claimed in claim 18, wherein
said pressure source also is connected to a normally closed port of an air valve for controlling the operation of said brake means.

20. A mechanical handling apparatus according to claim 19, wherein said piston velocity governing means comprises
a plurality of electrical solenoid-operated air valves operative individually or collectively to vent air from said valve means in an amount determined by the position of the piston in the cylinder, whereby the piston is driven with a substantially constant predetermined velocity irrespective of the position thereof within the cylinder.

21. A mechanical handling apparatus as claimed in claim 20, wherein the vent ports of respective valves of said piston velocity governing means have differing cross-sectional areas to maximize the number of different vent cross-sectional openings, whereby to provide said substantially constant predetermind velocity of the piston.

22. A mechanical handling apparatus as claimed in claim 16, wherein said store means contains information concerning spatial parameters defining a no-go area through which it is impermissible for said utilization means to pass and instructions for enabling said utilization means to manoeuvre around said no-go area.

23. A mechanical handling apparatus as claimed in claim 16, wherein said store means is provided with a plurality of differing sets of strategy information, each set defining a type of motion the utilization means is to make, and including means for selecting a particular strategy in combination with start and finish coordinates the utilization means is to adopt, whereby the motion of said utilization means between its start and finish coordinates is determined by the strategy selected.

24. A mechanical handling apparatus according to claim 15, wherein said load beam means comprises
  a load beam,
  rails disposed on opposite sides of said load beam and guided by said bearing means, and wherein said bearing means comprises
  at least one pair of longitudinally disposed rollers for each rail.

25. A mechanical handling apparatus as claimed in claim 24, wherein
  said load beam has an inverted U-shaped cross-section.

26. A mechanical handling apparatus as claimed in claim 25, including
  an activating means,
  and wherein said brake means comprises
  a pivoted caliper,
  a pair of arms each connected at one end thereof to said caliper, and
  friction materials on the outer faces of said arms at the free ends thereof engageable with the inside faces of said U-shaped load beam,
  said brake means being coactive with said activating means to engage said friction material with said load beam in accordance with the position of said activating means.

27. A mechanical handling apparatus as claimed in claim 26, wherein said activating means comprises
  cylinders in the outer surfaces of said arms intermediate the pivot of said caliper and the friction material associated therewith,
  a dumb-bell shaped piston extending across the pivot axis of said caliper, said piston having a pressure equalizing channel extending through the central portion thereof into said cylinders,
  a port for admitting pneumatic pressure to one of the cylinders, and
  a compression spring for maintaining the nonactivated state of said brake means, whereby in operation the piston is stationary and the caliper moves relative to said piston.

28. A mechanical handling apparatus as claimed in claim 27,
  wherein said compression spring is arranged to hold said brake means normally in engagement with said load beam means and wherein said brake means is released by admitting pneumatic pressure to one of said cylinders.

29. A mechanical handling apparatus as claimed in claim 15, including
  a lead screw, said stepping motor means being operatively connected to said lead screw, said lead screw being operatively connected to said brake means in a substantially backlash free manner, and the axis of said lead screw being substantially parallel to the axis of said load beam means.

30. A mechanical handling apparatus as claimed in claim 29, including
  axially disposed recirculating ball nuts in operative association with said lead screw, and wherein
  said brake means is mounted on said lead screw through the intermediary of said ball nuts.

31. A mechanical handling apparatus as claimed in claim 30, including
  a flexible coupling between and interconnecting said stepping motor means and said lead screw.

32. A mechanical handling apparatus as claimed in claim 31, wherein said position detecting means comprises
  an absolute displacement transducer, and wherein said transducer comprises
  a rod having means at one end thereof for producing an electrical launch pulse at a predetermined repetition rate,
  a torsion transducer, and
  a plurality of magnet means circumferentially surrounding said rod and longitudinally spaced therealong, one of said magnet means being connected to travel with said load beam means and another of said magnet means being connected to travel with said brake means, and
  distance determining means for determining the time taken for a launched pulse to be returned from a respective one of said magnet means as a torsion pulse to the torsional transducer from which time the position of the respective magnet means can be determined.

33. A mechanical handling apparatus as claimed in claim 32, wherein said magnet means comprises
  four equi-circumferentially spaced magnets.

34. A mechanical handling apparatus as claimed in claim 33, wherein said control means further includes
  an electronic microprocessor connected and operative to receive and to provide inputs to the store means and to the position detecting means and in response thereto to transmit commands to said valve means and to said piston velocity governing means, said valve being operative to determine the operation of said brake means and said stepping motor means.

35. A mechanical handling apparatus as claimed in claim 34, wherein said store means comprises
  a CMOS random access memory (CMOS RAM) for data storage, and
  a random access memory (RAM) for temporary data storage.

36. A mechanical handling apparatus as claimed in claim 35, wherein said CMOS RAM includes means operative to update the information in the RAM after each terminal point of travel of the utilization means has been reached, for reducing the amount of travel of said brake means along said stepping motor lead screw.

37. A mechanical handling apparatus as claimed in claim 13, wherein said utilization means is selected from one of pneumatic finger members, vacuum cups, and electromagnetic pads.

38. A mechanical handling apparatus according to claim 13, wherein said utilization means includes
two arms perpendicularly arranged each with respect to the other, said arms providing motion in x and y directions whereby the utilization means of one is the arm of the other.

39. A mechanical handling apparatus as claimed in any preceding claim for motion in three mutually perpendicular x, y and z directions wherein the utilization means of each of the arms in the x and y directions are connected in mutually perpendicular fashion such that the arm in the x direction is connected to the arm in the y direction which in turn is connected to the arm in the y direction and the mounting for the x arm forms the apparatus mounting respective to which motion takes place in each of the three directions.

* * * * *